(12) United States Patent
Ding et al.

(10) Patent No.: US 11,237,440 B2
(45) Date of Patent: Feb. 1, 2022

(54) PIXEL STRUCTURE AND MANUFACTURING METHOD THEREOF, ARRAY SUBSTRATE AND DISPLAY DEVICE

(71) Applicants: BOE TECHNOLOGY GROUP CO., LTD., Beijing (CN); ORDOS YUANSHENG OPTOELECTRONICS TECHNOLOGY CO., LTD., Inner Mongolia (CN)

(72) Inventors: Duolong Ding, Beijing (CN); Huafeng Liu, Beijing (CN); Shengwei Zhao, Beijing (CN); Chaochao Sun, Beijing (CN); Chao Wang, Beijing (CN); Jingping Lv, Beijing (CN); Meng Yang, Beijing (CN); Lei Yang, Beijing (CN); Chongliang Hu, Beijing (CN); Lin Xie, Beijing (CN); Bule Shun, Beijing (CN); Shimin Sun, Beijing (CN)

(73) Assignees: BOE TECHNOLOGY GROUP CO., LTD., Beijing (CN); ORDOS YUANSHENG OPTOELECTRONICS CO., LTD., Ordos (CN)

( * ) Notice: Subject to any disclaimer, the term of this patent is extended or adjusted under 35 U.S.C. 154(b) by 454 days.

(21) Appl. No.: 15/769,640

(22) PCT Filed: Aug. 7, 2017

(86) PCT No.: PCT/CN2017/096203
§ 371 (c)(1),
(2) Date: Apr. 19, 2018

(87) PCT Pub. No.: WO2018/126676
PCT Pub. Date: Jul. 12, 2018

(65) Prior Publication Data
US 2020/0241369 A1 Jul. 30, 2020

(30) Foreign Application Priority Data

Jan. 4, 2017 (CN) .......................... 201710005218.X

(51) Int. Cl.
*G02F 1/1362* (2006.01)
(52) U.S. Cl.
CPC .. *G02F 1/136286* (2013.01); *G02F 1/136213* (2013.01); *G02F 1/136227* (2013.01); *G02F 2201/121* (2013.01); *G02F 2201/123* (2013.01)
(58) Field of Classification Search
CPC ......... G02F 1/136286; G02F 1/136213; G02F 1/136227
See application file for complete search history.

(56) References Cited

U.S. PATENT DOCUMENTS 8,058,651 B2 * 11/2011 Park .................. G02F 1/134363
257/59
2006/0125989 A1 6/2006 Park et al.
(Continued)

FOREIGN PATENT DOCUMENTS

CN 1797162 A 7/2006
CN 1992293 A 7/2007
(Continued)

OTHER PUBLICATIONS

International Search Report and Written Opinion dated Nov. 7, 2017; PCT/CN2017/096203.

*Primary Examiner* — Dung T Nguyen

(57) ABSTRACT

A pixel structure and a manufacturing method thereof, an array substrate and a display device are provided. The pixel structure includes: a signal line; a common electrode line an extension direction of which is same as an extension direction of the signal line; a transistor including a semiconductor layer which includes a source region and a drain region; a first storage electrode which is insulated from the common (Continued)

electrode line and is connected with the drain region of the semiconductor layer; and a second storage electrode which is connected with the common electrode line and is insulated from the first storage electrode. In the pixel structure, portions, between the signal line and the common electrode line, of the first storage electrode and the second storage electrode includes overlap with each other to form a first storage capacitance.

18 Claims, 5 Drawing Sheets

(56) References Cited

U.S. PATENT DOCUMENTS

| | | | |
|---|---|---|---|
| 2007/0002249 A1* | 1/2007 | Yoo | G02F 1/134363 |
| | | | 349/141 |
| 2010/0201898 A1 | 8/2010 | Lim | |
| 2010/0213463 A1 | 8/2010 | Park et al. | |
| 2014/0141574 A1* | 5/2014 | Zhan | H01L 28/87 |
| | | | 438/155 |

FOREIGN PATENT DOCUMENTS

| | | |
|---|---|---|
| CN | 102269901 A | 12/2011 |
| CN | 104298034 A | 1/2015 |
| CN | 104460067 A | 3/2015 |
| CN | 106483728 A | 3/2017 |

* cited by examiner ved state of liquid crystal molecules is changed byout the scope of this disclosure.

PIXEL STRUCTURE AND MANUFACTURING METHOD THEREOF, ARRAY SUBSTRATE AND DISPLAY DEVICE

TECHNICAL FIELD

Embodiments of the present disclosure relate to a pixel structure and a manufacturing method thereof, an array substrate and a display device.

BACKGROUND

A liquid crystal display is a display device in which an arrangement state of liquid crystal molecules is changed by an electric field to modulate the transmission of backlight, and then to realize display.

At present, users' requirements for performances of liquid crystal displays are higher and higher. For example, performances such as higher resolution, higher brightness, higher contrast, larger screen size, and faster response speed are constantly being pursued.

SUMMARY

Embodiments of the present disclosure provide a pixel structure and a manufacturing method thereof, an array substrate and a display device, and embodiments of the present disclosure improve the storage capacitance of the pixel structure.

At least one embodiment of the present disclosure provides a pixel structure, and the pixel structure includes: a signal line; a common electrode line, an extension direction of the common electrode line and an extension direction of the signal line being same as each other; a transistor including a semiconductor layer which includes a source region and a drain region; a first storage electrode which is insulated from the common electrode line and is connected with the drain region of the semiconductor layer; and a second storage electrode which is connected with the common electrode line and is insulated from the first storage electrode. In the pixel structure, each of the first storage electrode and the second storage electrode includes a portion between the signal line and the common electrode line, and the portion of the first storage electrode overlaps the portion of the second electrode, to form a first storage capacitance between the first storage electrode and the second storage electrode.

For example, the pixel structure further includes a support substrate, the signal line, the common electrode line, the transistor, the first storage electrode and the second storage electrode are on the support substrate; and an orthographic projection of the portion of the first storage electrode on the support substrate and an orthographic projection of the portion, which overlaps the portion of the first storage electrode, of the second storage electrode on the support substrate are both at least between an orthographic projection of the signal line on the support substrate and an orthographic projection of the common electrode line on the support substrate.

For example, the signal line and the common electrode line are in a same layer.

For example, the first storage electrode further overlaps the common electrode line to form a second storage capacitance.

For example, the first storage electrode and the semiconductor layer are in a same layer.

For example, the second storage electrode and the common electrode line are in a same layer.

For example, the pixel structure further includes a third storage electrode, the third storage electrode is connected with the first storage electrode and is insulated from the second storage electrode, and the third storage electrode overlaps the second storage electrode to form a third storage capacitance.

For example, the pixel structure further includes a support substrate, the signal line, the common electrode line, the transistor, the first storage electrode, the second storage electrode and the third storage electrode are on the support substrate; and orthographic projections of portions, which overlap each other, of the third storage electrode and the second storage electrode on the support substrate are at least between an orthographic projection of the signal line on the support substrate and an orthographic projection of the common electrode line on the support substrate.

For example, the third storage electrode is connected with the first storage electrode by a via hole, and an orthographic projection of the via hole on the support substrate is between the orthographic projection of the common electrode line on the support substrate and the orthographic projection of the signal line on the support substrate.

For example, the pixel structure further includes a pixel electrode, the third storage electrode is between the pixel electrode and the first storage electrode, and the third storage electrode is connected with the pixel electrode.

For example, the semiconductor layer includes a first extension portion and a second extension portion which are connected with each other, and an extension direction of the first extension portion intersects an extension direction of the second extension portion, the first extension portion includes the source region, and the second extension portion extends along the common electrode line and is connected with the first storage electrode.

For example, the second extension portion and the common electrode line are insulated from each other and overlap with each other to form a fourth storage electrode.

For example, the pixel structure further includes a data line which intersects the common electrode line and is connected with the source region, and the data line overlaps the first extension portion.

For example, the first extension portion includes the source region, a first channel region, a connection region, a second channel region and the drain region which are connected successively.

For example, the signal line is a gate line, and the first channel region and the signal line overlap with each other.

For example, the signal line includes a protrusion portion, and the protrusion portion and the second channel region overlap each other.

At least one embodiment of the present disclosure further provides an array substrate, and the array substrate includes the pixel structure described in any one of the above embodiments.

At least one embodiment of the present disclosure further provides a display device, and the display device includes the array substrate described above.

At least one embodiment of the present disclosure further provides a manufacturing method of a pixel structure, and the method includes: forming a signal line and a common electrode line which are spaced apart from each other on a support substrate; forming a transistor on the support substrate, so that the transistor includes a semiconductor layer, and the semiconductor layer includes a source region and a drain region; forming a first storage electrode on the support substrate, so that the first storage electrode is insulated from the common electrode line and is connected with the drain region of the semiconductor layer; and forming a second storage electrode on the support substrate, and the second storage electrode is connected with the common electrode line and is insulated from the first storage electrode. In the method, each of an orthographic projection of the first storage electrode on the support substrate and an orthographic projection of the second storage electrode on the support substrate includes a portion between an orthographic projection of the signal line on the support substrate and an orthographic projection of the common electrode line on the support substrate, and the portion of the orthographic projection of the first storage electrode on the support substrate overlaps the portion of the orthographic projection of the second storage electrode on the support substrate, to form a first storage capacitance between the first storage electrode and the second storage electrode.

For example, a conducting layer is formed on the support substrate, so that the conducting layer includes the signal line, the common electrode line and the second storage electrode; a semiconductor film is formed on the support substrate, so that the semiconductor film includes the semiconductor layer and the first storage electrode; and an insulating layer is formed between the conducting layer and the semiconductor film, so that the insulating layer insulates the first storage electrode from the second storage electrode.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not imitative of the disclosure.

FIG. 1b is a circuit diagram of the pixel structure shown in FIG. 1a;

FIG. 2b is a schematic view of a first storage electrode and a semiconductor layer illustrated in FIG. 2a;

FIG. 2c is a schematic view of a second storage electrode and a common electrode line illustrated in FIG. 2a;

FIG. 2d is a schematic view of a signal line illustrated in FIG. 2a;

FIG. 2e is a schematic cross-section view along A-A and B-B illustrated in FIG. 2a;

FIG. 4b is a cross-section schematic view along A-A and B-B illustrated in FIG. 4a;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
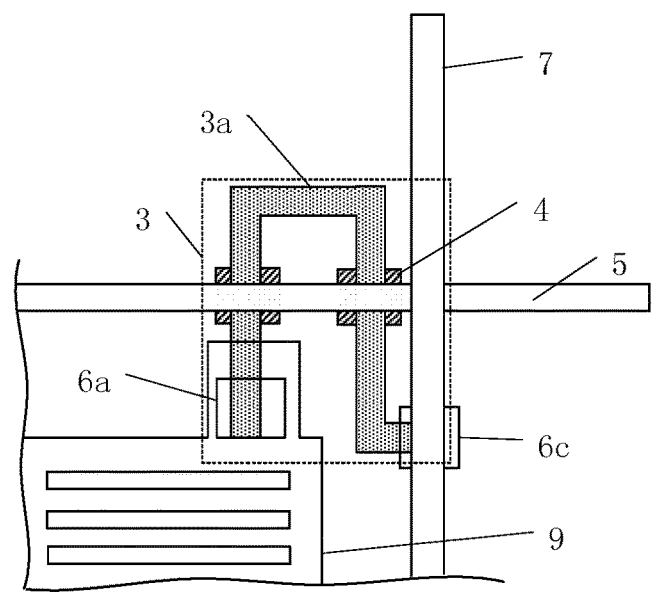
FIG. 1a is a schematic top view of a pixel structure.
Figure 1B:
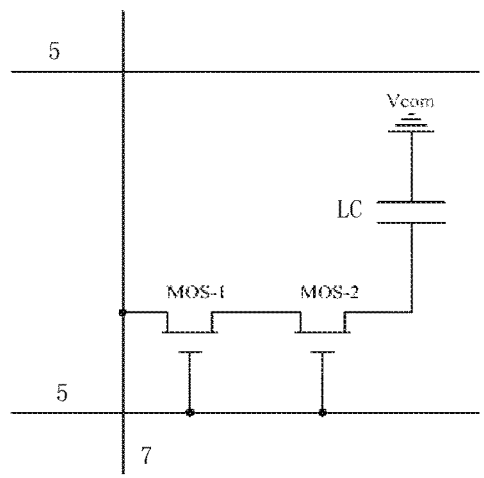

FIG. 1a is a schematic top view of a pixel structure; and FIG. 1b is a circuit diagram of the pixel structure illustrated in FIG. 1a. As shown in FIG. 1a and FIG. 1b, the pixel includes a gate line 5, a data line 7, a transistor 3 and a pixel electrode 9. A semiconductor layer 3a of the transistor 3 includes two channel regions which overlap a light-shielding layer 4 and the gate line 5, and the transistor 3 further includes a source region connected with the data line 7 by a via hole 6c and includes a drain region connected with the pixel electrode 9 by a via hole 6a; the transistor is a double-gate transistor, and the transistor includes a source transistor MOS-1 and a drain transistor MOS-2 as illustrated in FIG. 1b. In a liquid crystal display, a storage capacitance of the pixel structure consists of a liquid crystal capacitance LC formed by the pixel electrode and a common electrode (a voltage Vcom is applied to the common electrode when the common electrode is in operation).

Inventors of the present disclosure have noticed that, in a liquid crystal display with a large size and high resolution, the pixel structure illustrated in FIG. 1a and FIG. 1b exists defects such as insufficient effective charge-discharge time of pixel and an insufficient pixel-voltage holding ability or the like, because of an insufficient storage capacitance.

Embodiments of the present disclosure disclose a pixel structure and a manufacturing method thereof, an array substrate and a display device. Embodiments of the disclosure are described in detail below in connection with the drawings.

Figure 2A:
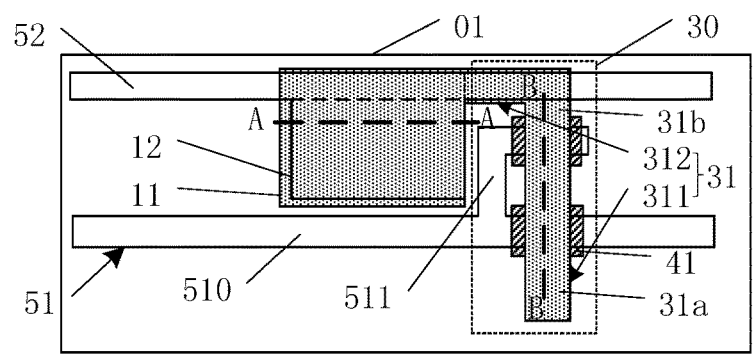
FIG. 2a is a first schematic top view of a pixel structure provided by at least one embodiment of the present disclosure.
Figure 2B:
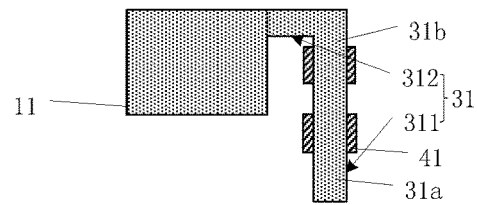
Figure 2C:
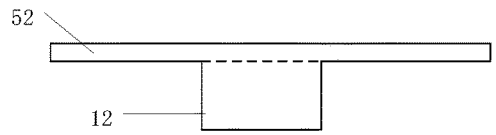
Figure 2D:
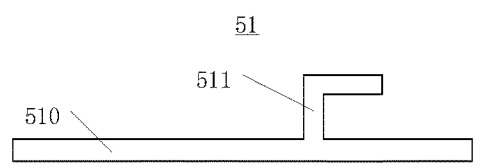
Figure 2E:
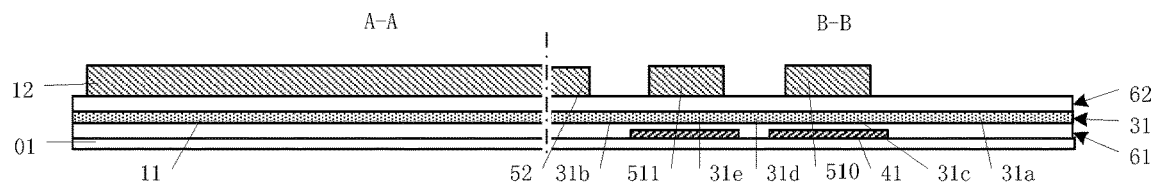

At least one embodiment of the present disclosure provides a pixel structure, as shown in FIG. 2a-FIG. 2e, the pixel structure includes: a signal line 51; a common electrode line 52, which has an extension direction substantially same as an extension direction of the signal line 51; a transistor 30 including a semiconductor layer 31 which includes a source region 31a and a drain region 31b; a first storage electrode 11 which is insulated from the common electrode line 52 (for example, the first storage electrode 11 is insulated from the common electrode line 52 by an insulating layer 62 illustrated in FIG. 2e) and is connected with the drain region 31b of the semiconductor layer 31; and a second storage electrode 12 which is connected with the common electrode line 52 so that a common electrode signal is applied to the second storage electrode 12 during operation, the second storage electrode 12 being insulated from the first storage electrode 11 (for example, the second storage electrode 12 is insulated from the first storage electrode 11 by the insulating layer 62). In the pixel structure, each of the first storage electrode 11 and the second storage electrode 12 includes a portion between the signal line 51 and the common electrode line 52, and the portion of the first storage electrode 11 overlaps the portion of the second storage electrode 12, to form a first storage capacitance by the first storage electrode 11 and the second storage electrode 12.

In a case where the pixel structure provided by the embodiments of the present disclosure is applied in a liquid crystal display device, in addition to the liquid crystal capacitance formed by the pixel electrode and the common electrode of the liquid crystal display device, the storage capacitance of the pixel structure further includes the first storage capacitance formed by the portion of the first storage electrode 11 and the portion of the second storage electrode 12. For example, the first storage electrode 11 and the pixel electrode are not in a same layer and the second storage electrode 12 and the common electrode are not in a same layer. The first storage capacitance is connected in parallel with the liquid crystal capacitance to increase the storage capacitance of the pixel structure, and thus the embodiments of the present disclosure efficiently improve the effective charge-discharge time of pixel and the pixel-voltage holding ability, and reduce a charge loss ratio caused by a leakage current. In another aspect, because the storage capacitance of the pixel structure is increased in the embodiments of the present disclosure, defects such as a driving resistance increase, flicker, crosstalk or the like caused by process fluctuations of the gate line, the data line or the like are efficiently reduced or eliminated. In still another aspect, compared with the pixel structure illustrated in FIG. 1a, the embodiments of the present disclosure make full use of the spare space in the pixel structure and reduce space waste by forming the first storage capacitance using the non-display region between the signal line 51 and the common electrode line 52.

For example, the pixel structure provided by an embodiment of the present disclosure further includes a support substrate 01, and the above-mentioned signal line, the common electrode line, transistor, the first storage electrode and the second storage electrode are on a support surface of the support substrate 01. In this case, an orthographic projection of the portion of the first storage electrode 11 on the support substrate 01 and an orthographic projection of the portion, which overlaps the portion of the first storage electrode 11, of the second storage electrode 12 on the support substrate 01 are both at least between an orthographic projection of the signal line 51 on the support substrate 01 and an orthographic projection of the common electrode line 52 on the support substrate 01; and "overlap" mentioned in the embodiments of the present disclosure relates to an overlap in a direction perpendicular to the support surface of the support substrate 01.

For example, the signal line 51 and the common electrode line 52 are in a same layer so that both the signal line 51 and the common electrode line 52 are formed, for example, by performing a patterning process on a same film to simplify the manufacturing process of the pixel structure. For example, both the signal line 51 and the common electrode line 52 are formed by a gate metal layer.

For example, the signal line 51 is electrically connected with a gate, the source region and the drain region of the transistor 30. For example, the signal line 51 is a gate line, i.e. the signal line 51 is applied with a gate scanning signal during operation.

For example, as shown in FIG. 2a, the first storage electrode 11 further overlaps the common electrode line 52 to form a second storage capacitance, and thus the storage capacitance of the pixel structure is further increased.

For example, the first storage electrode 11 and the semiconductor layer 31 are arranged in a same layer. For example, as shown in FIG. 2b, the first storage electrode 11 and the semiconductor layer 31 are formed integrally to simplify the pixel structure. In at least one embodiment of the present disclosure, the first storage electrode 11 and the semiconductor layer 31 are in a same layer, which enables that both the first storage electrode 11 and the semiconductor layer 31 can be formed by performing a patterning process on a same film to simplify the manufacturing process.

For example, the second storage electrode 12 and the common electrode line 52 are in a same layer. For example, as shown in FIG. 2c, the second storage electrode 12 and the common electrode line 52 are formed integrally to simplify the pixel structure. In at least one embodiment of the present disclosure, the second storage electrode 12 and the common electrode line 52 are in a same layer, which enables that both the second storage electrode 12 and the common electrode line 52 can be formed by performing a patterning process on a same film to simplify the manufacturing process.

In at least one embodiment of the present disclosure, the first storage electrode 11 and the semiconductor layer 31 are in a same layer, the second storage electrode 12 and the common electrode line 52 are in a same layer, such an arrangement can be realized only by modifying the masks used for making the semiconductor layer and the common electrode line in the manufacturing process of the pixel structure, and there is no need to add other steps. Therefore, the manufacturing process of the at least one embodiment of the present disclosure is simple.

In at least one embodiment of the present disclosure, the drain region 31b of the transistor 30 is connected with the pixel electrode (as illustrated in the following FIG. 4a and FIG. 4b) of the pixel structure to control the work state of the liquid crystal capacitance of the pixel structure. The first storage electrode 11 is connected with the drain region 31b of the transistor 30, so the transistor 30 can further control the work state of the first storage capacitance.

For example, the semiconductor layer 31 of the transistor 30 is made of a semiconductor material such as low temperature polycrystalline silicon material, metallic oxide or amorphous silicon or the like.

For example, a plane shape of the semiconductor layer 31 of the transistor 30 is a shape of L. For example, as shown in FIG. 2a and FIG. 2b, the semiconductor layer 31 includes a first extension portion 311 and a second extension portion 312 which are connected with each other, an extension direction of the first extension portion 311 intersects an extension direction of the second extension portion 312, the first extension portion 311 includes the source region 31a, and the second extension portion 312 substantially extends along the common electrode line 52 and is connected with the first storage electrode 11. Compared with the U-shaped semiconductor layer 3a of the transistor 3 illustrated in FIG. 1a, the semiconductor layer 31 which is in a shape of L in at least one embodiment of the present disclosure takes up less space, and thereby the first storage electrode 11 which is in the same layer provided with the semiconductor layer 31 can be made larger to obtain a larger storage capacitance.

For example, as shown in FIG. 2a, the second extension portion 312 and the common electrode line 52 are insulated from each other and overlap with each other to form a fourth storage capacitance. Because the fourth storage capacitance is formed by the second extension portion 312 and the common electrode line 52, the storage capacitance of the pixel structure is further increased; in addition, it is beneficial to obtain the first storage electrode 11 with a larger area by making the second extension portion 312 and the common electrode line 52 overlap with each other, and thus a larger storage capacitance is obtained.

For example, as shown in FIG. 2a, FIG. 2b and FIG. 2e, the first extension portion 311 includes the source region 31a, a first channel region 31c, a connection region 31d, a second channel region 31e and the drain region 31b which are connected successively. In this case, the transistor 30 is a double-gate transistor to improve the stability of the transistor 30. For example, in other embodiments of the present disclosure, the transistor 30 also can be a single-gate transistor and in this case, the first extension portion 311 can only include the source region 31a, the first channel region 31c and the drain region 31b which are connected successively.

For example, in a case where the semiconductor layer 31 is made of low temperature polycrystalline silicon material, both the first channel region 31c and the second channel region 31e are undoped regions, and the source region 31a, the drain region 31b and the connection region 31d are doped regions.

For example, in a case where the signal line 51 is a gate line, as shown in FIG. 2a, the first channel region 31c and the signal line 51 overlap with each other. In at least one embodiment of the present disclosure, a first gate electrode of the transistor 30 is formed by a portion of the gate line, which portion overlaps the first channel region 31c, and this is helpful to simplify the structure of the transistor 30.

For example, in a case where the signal line 51 is a gate line, as shown in FIG. 2a, FIG. 2d and FIG. 2e, the signal line 51 includes a body portion 510 extending along a direction that is substantially the same as the extension direction of the common electrode line 52 and a protrusion portion 511 extending from the body portion 510, and the body portion 510 overlaps the first channel region 31c, and the protrusion portion 511 overlaps the second channel region 31e. In at least one embodiment of the present disclosure, a second gate electrode of the transistor 30 can be formed and the structure of the transistor 30 can be simplified by making the gate line form the protrusion portion 511 which overlaps the second channel region 31e.

For example, the plane shape of protrusion portion 511 is a shape of L. Two gate electrodes of the transistor 30 are formed by the signal line 51 which includes the body portion 510 and the protrusion portion 511 which is in a shape of L, and this is helpful to reduce the space taken up by the semiconductor layer 31 to obtain a larger first storage capacitance.

For example, as shown in FIG. 2a, FIG. 2d and FIG. 2e, the pixel structure provided by at least one embodiment of the present disclosure further includes a light-shielding layer 41, and the light-shielding layer 41 is at a side of the semiconductor layer 31, which side faces the support substrate 01, and the light-shielding layer 41 overlaps the first channel region 31c and overlaps the second channel region 31e. For example, the pixel structure further includes a buffer insulating layer 61 which covers the light-shielding layer 41 to insulate the light-shielding layer 41 and the semiconductor layer 31.

Figure 3:
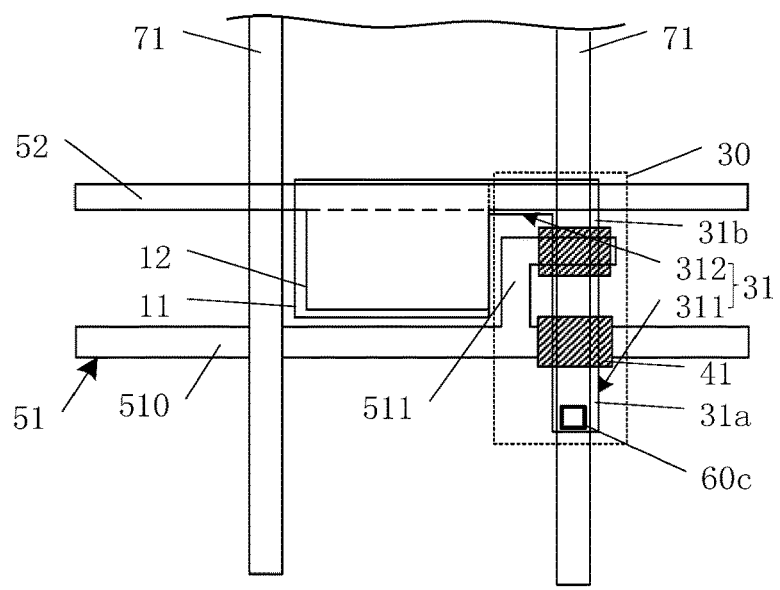
FIG. 3 is a second schematic view of the pixel structure provided by at least one embodiment of the present disclosure.

For example, as shown in FIG. 3, the pixel structure further includes a data line 71 which intersects the common electrode line 52 and is connected with the source region 31a (for example, the connection is achieved through a via hole 60c), and the data line 71 overlaps the first extension portion 311. For example, in this case, the signal line 51 is a gate line. In at least one embodiment of the present disclosure, the first extension portion 311 overlaps the data line 71, and this is helpful to increase the area of the first storage electrode 11 which is in the same layer provided with the semiconductor layer 31 to obtain a larger first storage capacitance.

Figure 4A:
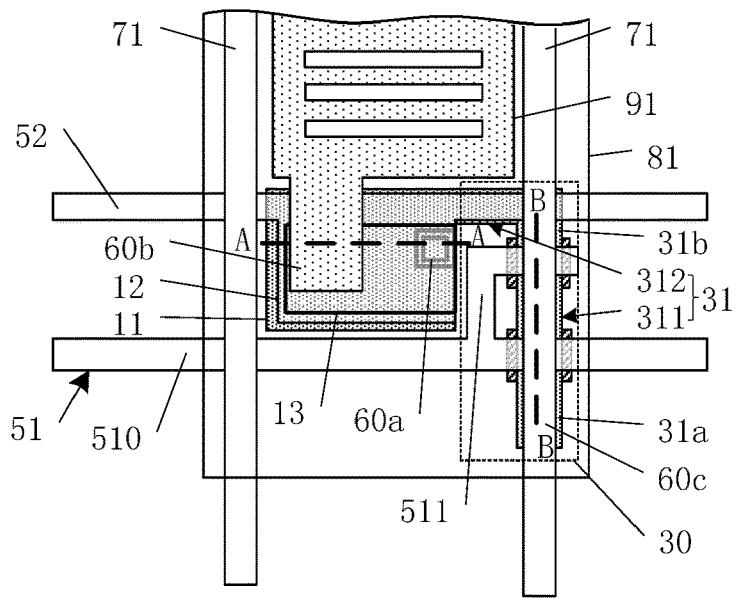
FIG. 4a is a third schematic top view of the pixel structure provided by at least one embodiment of the present disclosure.
Figure 4B:
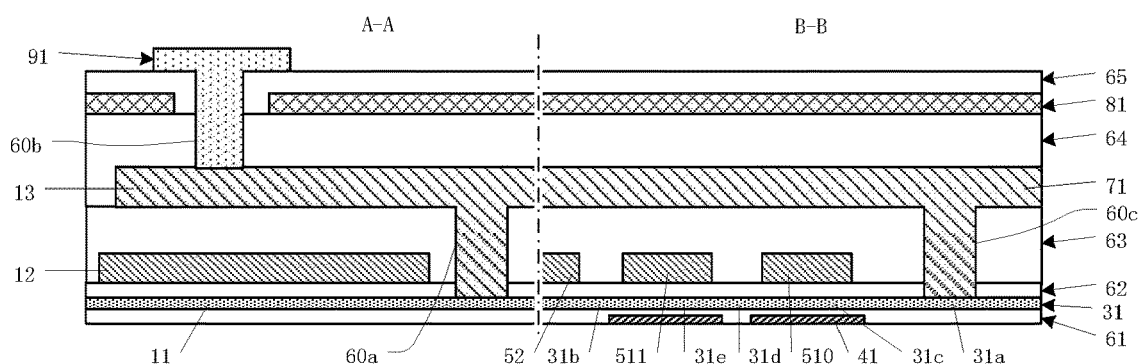

For example, as shown in FIG. 4a and FIG. 4b, the pixel structure provided by at least one embodiment of the present disclosure further includes a third storage electrode 13, the third storage electrode 13 is connected with the first storage electrode 11 and is insulated from the second storage electrode 12, and the third storage electrode 13 overlaps the second storage electrode 12 to form a third storage capacitance. In at least one embodiment of the present disclosure, the third storage electrode 13 is connected with the first storage electrode 11, and thus the third storage capacitance formed by the second storage electrode and the third storage electrode is connected in parallel with the first storage capacitance formed by the first storage electrode and the second storage electrode, to further increase the storage capacitance of the pixel structure.

For example, orthographic projections of portions, which overlap each other, of the third storage electrode 13 and the second storage electrode 12 on the support substrate are at least between the orthographic projection of the signal line 51 on the support substrate and the orthographic projection of the common electrode line 52 on the support substrate. In this way, the utilization of the non-display region between the orthographic projection of the signal line 51 on the support substrate and the orthographic projection of the common electrode line 52 on the support substrate can be further improved, and the storage capacitance can be increased.

For example, the third storage electrode 13 and the data line 71 are in a same layer to simplify the manufacturing process.

For example, as shown in FIG. 4a and FIG. 4b, in a direction perpendicular to the support surface of the support substrate (not shown in the figures), the second storage electrode 12 is between the first storage electrode 11 and the third storage electrode 13, and the third storage electrode 13 is connected with the first storage electrode 11 by a via hole 60a passing through the insulation layer which is between the first storage electrode 11 and the third storage electrode 13, and an opening which allows the via hole 60a to pass through is provided in the second storage electrode 12. For example, an orthographic projection of the via hole 60a on the support substrate is between the orthographic projection of the common electrode line 52 on the support substrate and the orthographic projection of the signal line 51 on the support substrate. For example, in a direction perpendicular to the support surface of the support substrate, an interlayer insulating layer 63 is provided between the third storage electrode 13 and the second storage electrode 12, and the via hole 60a passes through the interlayer insulating layer 63 and the insulation layer 62. In at least one embodiment of the present disclosure, the orthographic projection of the whole via hole 60a which is used for electrical connection of the third storage electrode 13 and the first storage electrode 11 on the support substrate is between the orthographic projection of the common electrode line 52 on the support substrate and the orthographic projection of the signal line 51 on the support substrate, and this can avoid causing damages to the common electrode line 52 in making the via hole 60a.

For example, as shown in FIG. 4a and FIG. 4b, the pixel structure provided by at least one embodiment of the present disclosure further includes a pixel electrode 91, and in a direction perpendicular to the support surface of the support substrate, the third storage electrode 13 is between the pixel electrode 91 and the first storage electrode 11, and the third storage electrode 13 is connected with the pixel electrode 91, for example, the third storage electrode 13 is connected with the pixel electrode 91 by a via hole 60b passing through at least the insulating layer 64 which covers the third storage electrode 13. In at least one embodiment of the present disclosure, because the first storage electrode 11 is connected with the drain region 31b of the transistor 30 and the pixel electrode 91 is connected with the first storage electrode 11 through the third storage electrode 13, connection between the pixel electrode 91 and the drain region 31b is realized. Compared with the way in which the pixel electrode 91 is directly connected with the drain region 31b through the via hole, the at least one embodiment of the present disclosure reduces the difficulty in making the via hole which is used for the connection of the pixel electrode 91 and the drain region 31b.

For example, as shown in FIG. 4a and FIG. 4b, the pixel structure provided by at least one embodiment of the present disclosure further includes a common electrode 81. For example, the common electrode 81 is spaced apart from the pixel electrode 91 through a passivation insulating layer 65, so that the liquid crystal capacitance is formed by the common electrode 81 and the pixel electrode 91.

For example, the common electrode 81 and the second storage electrode 12 are connected with the same common electrode line 52, or connected with different common electrode lines; for example, the common electrode 81 is below the pixel electrode 91 as shown in FIG. 4b, or the common electrode 81 is on the pixel electrode 91.

Figure 5:
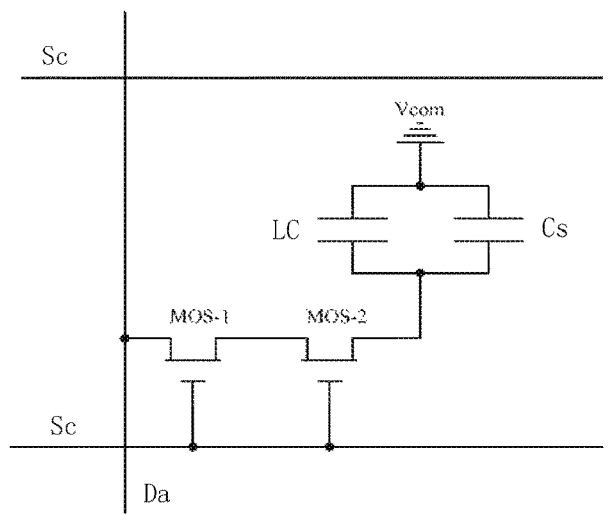
FIG. 5 is a circuit diagram of the pixel structure provided by at least one embodiment of the present disclosure.

FIG. 5 is a circuit diagram of the pixel structure provided by at least one embodiment of the present disclosure. As shown in FIG. 5, the pixel structure provided by at least one embodiment of the present disclosure includes a transistor 30, and the transistor 30, for example, is a double-gate transistor including a source transistor MOS-1 and a drain transistor MOS-2. The source region of the transistor 30 is connected with a data line Da, and the gate electrodes of the transistor 30 are connected with a gate line Sc; the pixel structure further includes a liquid crystal capacitance LC and an added storage capacitance Cs, both one electrode plate of the liquid crystal capacitance LC and one electrode plate of the storage capacitance Cs are connected with the drain region of the transistor 30, and a common electrode signal Vcom is applied to both the other electrode plate of the liquid crystal capacitance LC and the other electrode plate of the storage capacitance Cs, therefore, the storage capacitance of the pixel structure is a capacitance formed by connecting the liquid crystal capacitance LC and the storage capacitance Cs in parallel. Compared with the pixel structure illustrated in FIG. 1a and FIG. 1b, in at least one embodiment of the present disclosure, because the capacitance Cs is added, the storage capacitance is increased.

Figure 6:
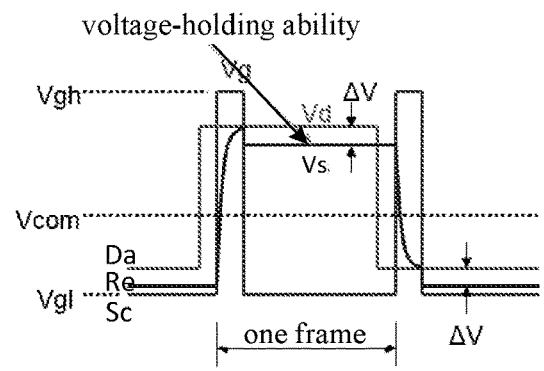
FIG. 6 is a schematic diagram illustrating a voltage-holding ability of the pixel structure provided by at least one embodiment of the present disclosure.

FIG. 6 is a schematic diagram illustrating a voltage holding ability of the pixel structure provided by at least one embodiment of the present disclosure. In FIG. 6, Da represents a data signal, Sc represents a gate scanning signal, Re represents an actual pixel voltage, Vgl represents a turn-off voltage of a gate line, Vcom represents a common electrode signal, Vgh represents a cut-in voltage of the gate line, and $\Delta V=Vd-Vs$ represents a pixel-voltage holding ability. Compared with the pixel structure illustrated in FIG. 1a and FIG. 1b, in a case where the same transistors are used and the leakage currents of the transistors are the same, because the storage capacitance is increased in at least one embodiment of the present disclosure, the pixel-voltage holding ability is enhanced; and even if a small part of charges for holding the pixel voltage disperse on the parasitic capacitance connected to the pixel electrode, because the storage capacitance is increased in at least one embodiment of the present disclosure, the interference from the parasitic capacitance to the voltage of the pixel electrode is reduced.

For example, in any one of the above embodiments of the present disclosure, the buffer insulating layer 61, the insulating layer 62, the interlayer insulating layer 63, the insulating layer 64 and the passivation insulating layer 65 can be made of an inorganic material (for example, $Si_3N_4$, $SiO_2$, or the like) or an organic material (for example, a resin, or the like). For example, in a case where the insulating layer 64 is a planarization layer, the insulating layer 64 is made of an organic material to obtain a large thickness, and thus the insulating layer 64 plays a role of planarization; for example, both the pixel electrode 91 and the common electrode 81 are made of a transparent conducting metallic oxide material such as indium zinc oxide, indium tin oxide or the like; for example, the light-shielding layer 41, the signal line 51, the common electrode line 52 and the data line 71 are made of a metallic material such as aluminum, aluminum alloy, copper, copper alloy, titanium, zirconium, molybdenum, molybdenum-niobium alloy or the like.

At least one embodiment of the present disclosure further provides an array substrate, and the array substrate includes the pixel structure described in any one of the above embodiments.

Figure 7:
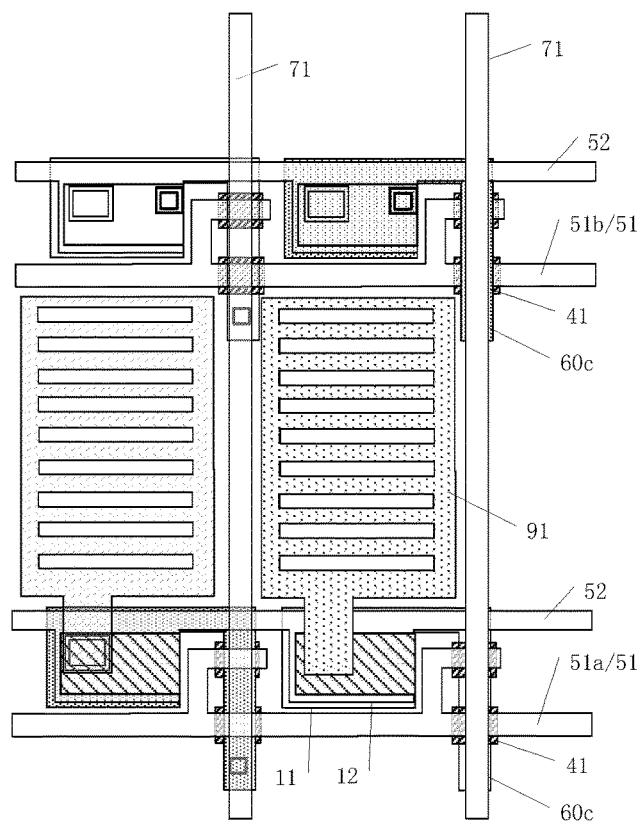
FIG. 7 is a schematic top view of an array substrate provided by at least one embodiment of the present disclosure.

For example, as shown in FIG. 7, in the array substrate, pixel structures are arranged in a matrix. Each pixel structure includes adjacent signal lines 51a and 51b, the common electrode line 52 is provided between an orthographic projection of the signal line 51a on the support substrate and an orthographic projection of the signal line 51b on the support substrate, and a distance between the signal line 51a and the common electrode line 52 is smaller than a distance between the signal line 51b and the common electrode line 52; in each pixel structure, the first storage electrode 11 and the second storage electrode 12 is between the common electrode line 52 and the signal line 51a which is closer to the common electrode line 52.

Figure 8:
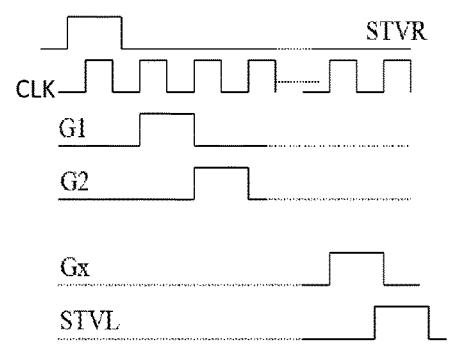
FIG. 8 is a schematic diagram of a timing sequence of a gate scanning signal when the array substrate provided by at least one embodiment of the present disclosure is in operation.

FIG. 8 is a schematic diagram of the timing sequence of the gate scanning signal when the array substrate is in operation. As shown in FIG. 8, a time signal of the gate driving circuit is illustrated as CLK, for example, when the array substrate is in operation, scanning signals are applied to gate lines G1, G2, . . . , Gx from two sides respectively, referring to the scanning start signal STVR at one side, and the scanning start signal STVL on the other opposite side. For example, when the array substrate is in operation, the common electrode line connected to the second storage electrode is continuously applied with a common electrode signal, and the work state of the first storage capacitance formed by the first storage electrode and the second storage electrode is controlled through the transistor connected to the first storage electrode.

At least one embodiment of the present disclosure provides a display device, and the display device includes the array substrate described in any one of the above embodiments.

For example, the display device further includes a black matrix, the common electrode line 52 and the signal line 51*a* which is closer to the common electrode line 52 and the region between the common electrode line 52 and the signal line 51*a* are shielded by the black matrix, and thus the region is a non-display region. In at least one embodiment of the present disclosure, the first storage capacitance formed by the first storage electrode and the second storage electrode is provided in the non-display region, which not only increases the storage capacitance of the pixel structure, but also makes full use of the space in the non-display region to avoid the impact on the aperture opening ratio.

For example, the display device provided by at least one embodiment of the present disclosure can be any product or component having a display function, such as a liquid crystal panel, an e-paper, a mobile phone, a panel computer, a TV set, a display, a laptop, a digital photo frame, a navigation instrument or the like.

At least one embodiment of the present disclosure further provides a manufacturing method of a pixel structure; taking the pixel structure illustrated in FIG. 2*a* as an example, the method includes: forming a signal line 51 and a common electrode line 52 which are spaced apart from each other on a support substrate 01, so that an extension direction of the common electrode line 52 is substantially same as an extension direction of the signal line 51; forming a transistor 30 on the support substrate 01, so that the transistor 30 includes a semiconductor layer 31 which includes a source region 31*a* and a drain region 31*b*; forming a first storage electrode 11 on the support substrate 01, so that the first storage electrode 11 is insulated from the common electrode line 52 and is connected with the drain region 31*b* of the semiconductor layer 31; and forming a second storage electrode 12 on the support substrate 01, so that the second storage electrode 12 is connected with the common electrode line 52 and is insulated from the first storage electrode 11. In the method, each of an orthographic projection of the first storage electrode 11 on the support substrate 01 and an orthographic projection of the second storage electrode 12 on the support substrate 01 include a portion between an orthographic projection of the signal line 51 on the support substrate 01 and an orthographic projection of the common electrode line 52 on the support substrate, and the portion of the orthographic projection of the first storage electrode 11 on the support substrate 01 overlaps the portion of the orthographic projection of the second storage electrode 12 on the support substrate 01, to form a first storage capacitance.

Figure 9A:
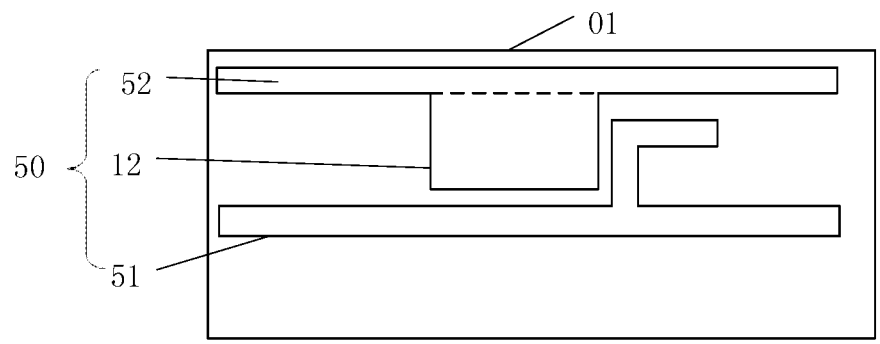
FIGS. 9a-9c are schematic views of forming a conducting layer, an insulating layer and a semiconductor film successively in a manufacturing method of the pixel structure provided by at least one embodiment of the present disclosure.
Figure 9B:
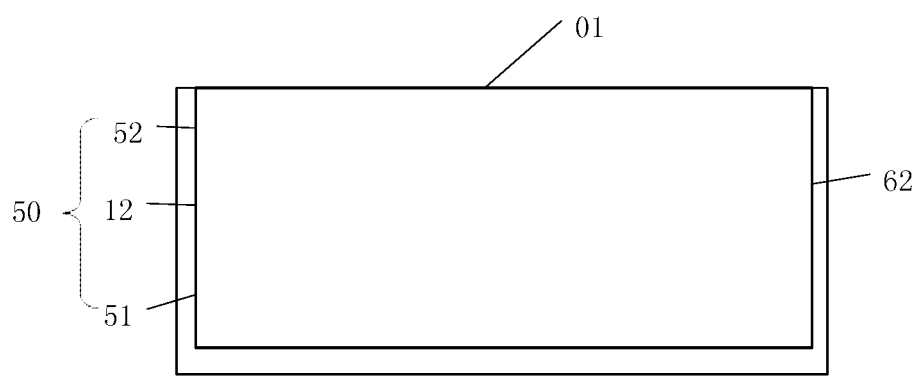
Figure 9C:
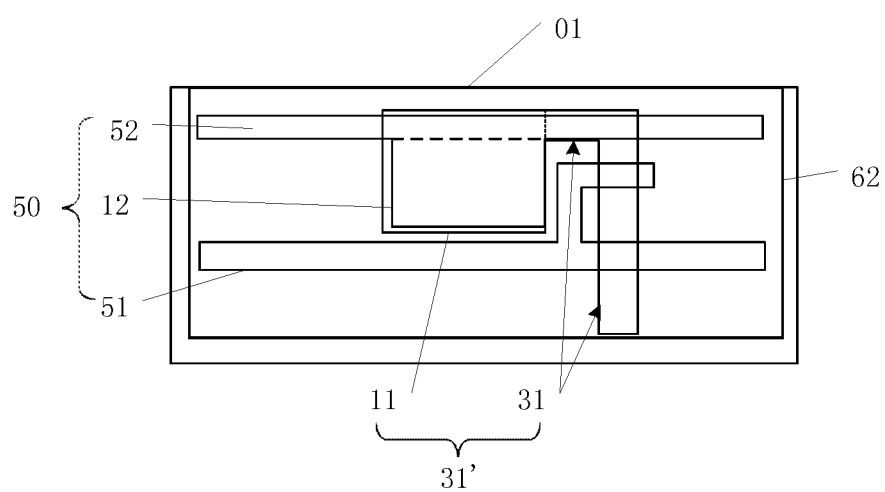

For example, as shown in FIGS. 9*a*-9*c*, the manufacturing method provided by at least one embodiment of the present disclosure includes: forming a conducting layer 50 on the support substrate 01, so that the conducting layer 50 includes the signal line 51, the common electrode line 52 and the second storage electrode 12, as illustrated in FIG. 9*a*; forming an insulating layer 62 on the support substrate 01, as illustrated in FIG. 9*b*; forming a semiconductor film 31' on the support substrate 01, so that the semiconductor film 31' includes the semiconductor layer 31 and the first storage electrode 11, as illustrated in FIG. 9*c*. In the method, the insulating layer 62 is formed between the conducting layer 50 and the semiconductor film 31' to insulate the first storage electrode 11 from the second storage electrode 12.

In FIGS. 9*a*-9*c*, it is illustrated by taking the example that the conducting layer 50 is formed first, and then the semiconductor film 31' is formed; in other embodiments, the semiconductor film 31' can be formed first, and then the conducting layer 50 is formed.

For example, the conducting layer 50 is a gate metal layer formed by performing a patterning process on a metal film, and in this case, the signal line 51 is, for example, a gate line.

For example, the semiconductor film 31' is formed by performing a patterning process on a whole film made of a semiconductor material.

In the manufacturing method provided by at least one embodiment of the present disclosure, the arrangement of each component can be referred to the related description in the embodiments of the pixel structure, and no more repetition is given herein.

In summary, in a case where the embodiments of the present disclosure are used in a liquid crystal display device, in addition to the liquid crystal capacitance formed by the pixel electrode and the common electrode, the storage capacitance of the pixel structure further includes the first storage capacitance formed by the first storage electrode and the second storage electrode, and the first storage capacitance is connected in parallel with the liquid crystal capacitance to increase the storage capacitance of the pixel structure, so the embodiments of the present disclosure can effectively improve the effective charge-discharge time of pixel and the pixel-voltage holding ability, and can effectively reduce a charge loss ratio caused by the leakage current. In another aspect, because the storage capacitance of the pixel structure is increased in the embodiments of the present disclosure, defects such as a driving resistance increase, flicker, crosstalk or the like, caused by process fluctuations in manufacturing the gate line or the data line or the like, can be efficiently reduced or eliminated. In still another aspect, the embodiments of the present disclosure make full use of the spare space in the pixel structure and reduce space waste by forming the first storage capacitance in the non-display region between the signal line and the common electrode line.

The following should be noted: (1) only the structures involved in the embodiments of the present disclosure are involved in the drawings of the present disclosure, and other structures can be referred to usual designs; (2) for the sake of clarity, the thicknesses of layers or regions are not in accordance with the actual scales in the drawings of the embodiments of the present disclosure, but are amplified to a certain extent; (3) the embodiments or the features in the embodiments can be combined in a case of no conflict.

What are described above is related to the illustrative embodiments of the disclosure only and not limitative to the scope of the disclosure; the scopes of the disclosure are defined by the accompanying claims.

The application claims priority to the Chinese patent application No. 201710005218.X filed on Jan. 4, 2017, the entire disclosure of which is incorporated herein by reference as part of the present application.

What is claimed is:

1. A pixel structure, comprising:
a signal line;
a common electrode line, wherein an extension direction of the common electrode line and an extension direction of the signal line are same as each other;
a transistor which comprises a semiconductor layer, wherein the semiconductor layer comprises a source region and a drain region;
a first storage electrode which is insulated from the common electrode line and is connected with the drain region of the semiconductor layer; and
a second storage electrode which is connected with the common electrode line, protrudes from the common electrode line towards the signal line, and is insulated from a support substrate the first storage electrode,
wherein each of the first storage electrode and the second storage electrode comprises a portion between the signal line and the common electrode line, an entirety of an orthographic projection of the second storage electrode on the support substrate is all located between an orthographic projection of the signal line on the support substrate and an edge of an orthographic projection of the common electrode line on the support substrate close to the signal line, and the portion of the first storage electrode overlaps the portion of the second storage electrode, to form a first storage capacitance between the first storage electrode and the second storage electrode, and
wherein the signal line, the common electrode line, the transistor, the first storage electrode and the second storage electrode are on the support substrate, and
an entirety of an orthographic projection of the first storage capacitance on the support substrate is all located between the orthographic projection of the signal line on the support substrate and the edge of the orthographic projection of the common electrode line on the support substrate close to the signal line, the orthographic projection of the first storage capacitance on the support substrate does not include a portion provided outside a region between the orthographic projection of the signal line on the support substrate and the edge of the orthographic projection of the common electrode line on the support substrate close to the signal line;
the pixel structure further comprises:
a third storage electrode on the support substrate, wherein the third storage electrode is connected with the first storage electrode and is insulated from the second storage electrode, and the third storage electrode overlaps the second storage electrode to form a third storage capacitance, and
an entirety of orthographic projections of portions, which overlap each other, of the third storage electrode and the second storage electrode on the support substrate are at least between the orthographic projection of the signal line on the support substrate and the edge of the orthographic projection of the common electrode line on the support substrate close to the signal line.

2. The pixel structure according to claim 1, wherein the signal line and the common electrode line are in a same layer.

3. The pixel structure according to claim 1, wherein the first storage electrode further overlaps the common electrode line to form a second storage capacitance.

4. The pixel structure according to claim 1, wherein the first storage electrode and the semiconductor layer are in a same layer.

5. The pixel structure according to claim 1, wherein the second storage electrode and the common electrode line are in a same layer.

6. The pixel structure according to claim 1, wherein the third storage electrode is connected with the first storage electrode by a via hole, and an orthographic projection of the via hole on the support substrate is between the orthographic projection of the common electrode line on the support substrate and the orthographic projection of the signal line on the support substrate.

7. The pixel structure according to claim 1, further comprising a pixel electrode, wherein the third storage electrode is between the pixel electrode and the first storage electrode, and the third storage electrode is connected with the pixel electrode.

8. The pixel structure according to claim 1, wherein the semiconductor layer comprises a first extension portion and a second extension portion which are connected with each other, an extension direction of the first extension portion intersects an extension direction of the second extension portion, the first extension portion comprises the source region, and the second extension portion extends along the common electrode line and is connected with the first storage electrode.

9. The pixel structure according to claim 8, wherein the second extension portion and the common electrode line are insulated from each other and overlap with each other to form a fourth storage capacitance.

10. The pixel structure according to claim 8, further comprising a data line which intersects the common electrode line and is connected with the source region, wherein the data line overlaps the first extension portion.

11. The pixel structure according to claim 8, wherein the first extension portion comprises the source region, a first channel region, a connection region, a second channel region and the drain region which are connected successively.

12. The pixel structure according to claim 11, wherein the signal line is a gate line, and the first channel region and the signal line overlap with each other.

13. The pixel structure according to claim 12, wherein the signal line comprises a protrusion portion, and the protrusion portion and the second channel region overlap each other.

14. An array substrate, comprising the pixel structure according to claim 1.

15. A display device, comprising the array substrate according to claim 14.

16. A manufacturing method of a pixel structure, comprising:
forming a signal line and a common electrode line which are spaced apart from each other on a support substrate;
forming a transistor on the support substrate, wherein the transistor comprises a semiconductor layer, and the semiconductor layer comprises a source region and a drain region;
forming a first storage electrode on the support substrate, wherein the first storage electrode is insulated from the common electrode line and is connected with the drain region of the semiconductor layer; and forming a second storage electrode on the support substrate, and the second storage electrode is connected with the common electrode line, protrudes from the common electrode line towards the signal line, and is insulated from the first storage electrode, wherein an entirety of an orthographic projection of the second storage electrode on the support substrate is all located between an orthographic projection of the signal line on the support substrate and an edge of an orthographic projection of the common electrode line on the support substrate close to the signal line, an entirety of an orthographic projection of the portion of the first storage electrode on the support substrate and an entirety of an orthographic projection of the portion, which overlaps the portion of the first storage electrode, of the second storage electrode on the support substrate are between the orthographic projection of the signal line on the support substrate and the edge of the orthographic projection of the common electrode line on the support substrate close to the signal line, to form a first storage capacitance between the first storage electrode and the second storage electrode, an entirety of an orthographic projection of the first storage capacitance on the support substrate is all located between the orthographic projection of the signal line on the support substrate and the edge of the orthographic projection of the common electrode line on the support substrate close to the signal line, the orthographic projection of the first storage capacitance on the support substrate does not include a portion provided outside a region between the orthographic projection of the signal line on the support substrate and the edge of the orthographic projection of the common electrode line on the support substrate close to the signal line;

the manufacturing method of the pixel structure further comprises:

forming a third storage electrode on the support substrate, wherein the third storage electrode is connected with the first storage electrode and is insulated from the second storage electrode, and the third storage electrode overlaps the second storage electrode to form a third storage capacitance, and an entirety of orthographic projections of portions, which overlap each other, of the third storage electrode and the second storage electrode on the support substrate are at least between the orthographic projection of the signal line on the support substrate and the edge of the orthographic projection of the common electrode line on the support substrate close to the signal line.

17. The manufacturing method of the pixel structure according to claim 16, further comprising:

forming a conducting layer on the support substrate, wherein the conducting layer comprises the signal line, the common electrode line and the second storage electrode;

forming a semiconductor film, wherein the semiconductor film comprises the semiconductor layer and the first storage electrode; and forming an insulating layer between the conducting layer and the semiconductor film, wherein the insulating layer insulates the first storage electrode from the second storage electrode.

18. A pixel structure, comprising:

a support substrate;

a semiconductor film provided on the support substrate, wherein the semiconductor film comprises a semiconductor layer and a first storage electrode, the semiconductor layer comprises a source region and a drain region, and the first storage electrode and the semiconductor layer are formed integrally; and a conducting layer provided at a side of the semiconductor film facing away from the support substrate, wherein the conducting layer comprises a signal line, a common electrode line, and a second storage electrode, the common electrode line is insulated from the first storage electrode, the second storage electrode is connected with the common electrode line, protrudes from the common electrode line towards the signal line, and is insulated from the first storage electrode, the conducting layer further comprises a gate electrode, an extension direction of the common electrode line and an extension direction of the signal line are same as each other, the second storage electrode and the common electrode line are formed integrally, wherein each of the first storage electrode and the second storage electrode comprises a portion between the signal line and an edge of the common electrode line close to the signal line, an entirety of an orthographic projection of the second storage electrode on the support substrate is all located between an orthographic projection of the signal line on the support substrate and an edge of an orthographic projection of the common electrode line on the support substrate close to the signal line, and the portion of the first storage electrode overlaps the portion of the second storage electrode to form a first storage capacitance between the first storage electrode and the second storage electrode, and an entirety of an orthographic projection of the first storage capacitance on the support substrate is all located between the orthographic projection of the signal line on the support substrate and the edge of the orthographic projection of the common electrode line on the support substrate close to the signal line, the orthographic projection of the first storage capacitance on the support substrate does not include a portion provided outside a region between the orthographic projection of the signal line on the support substrate and the orthographic projection of the common electrode line on the support substrate;

the pixel structure further comprises:

a third storage electrode on the support substrate, wherein the third storage electrode is connected with the first storage electrode and is insulated from the second storage electrode, and the third storage electrode overlaps the second storage electrode to form a third storage capacitance, and an entirety of orthographic projections of portions, which overlap each other, of the third storage electrode and the second storage electrode on the support substrate are at least between the orthographic projection of the signal line on the support substrate and the edge of the orthographic projection of the common electrode line on the support substrate close to the signal line.

* * * * *